Figures 1, 2:
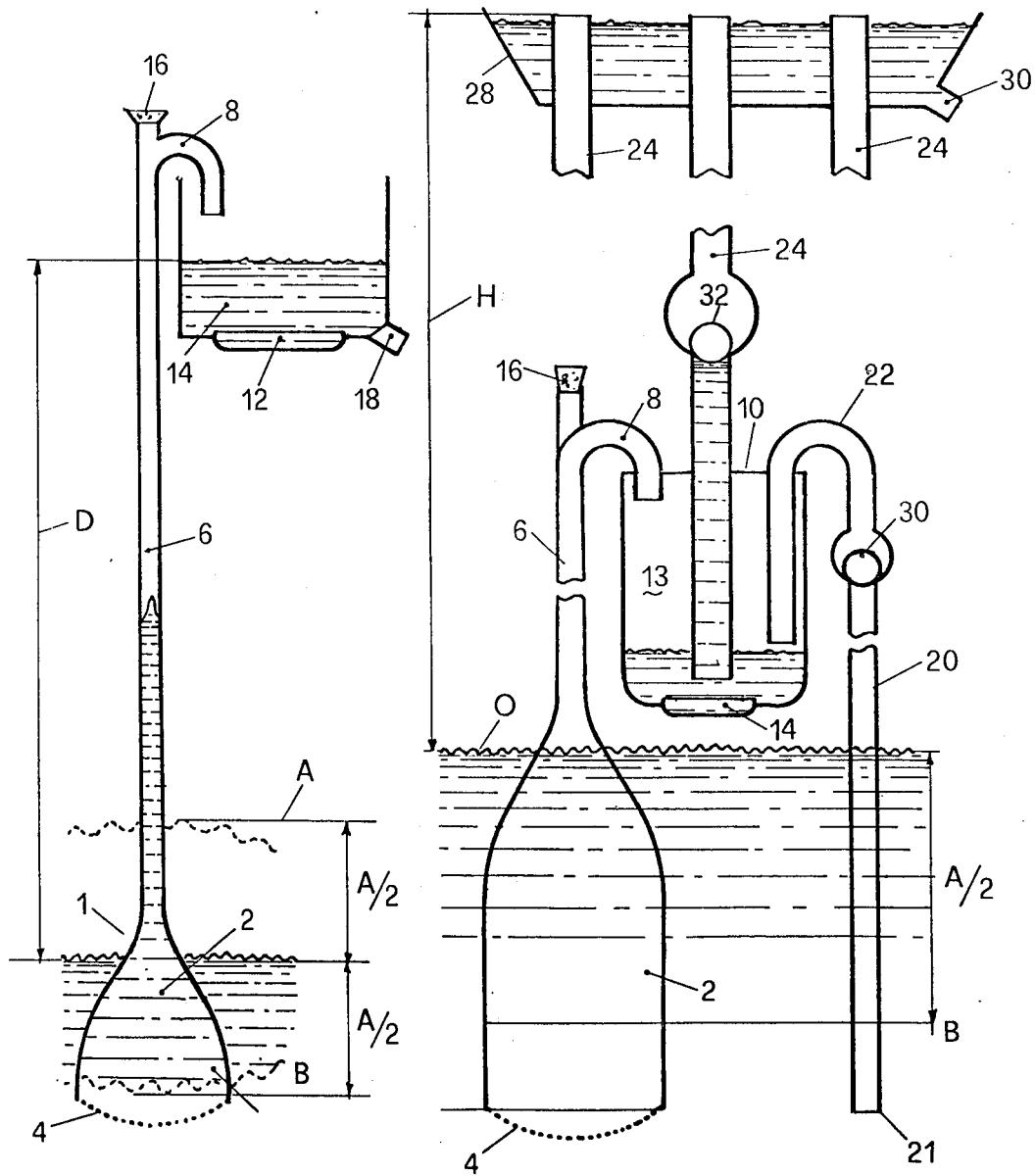

United States Patent [19]

Tanferna et al.

[11] 3,910,726

[45] Oct. 7, 1975

[54] WATER LIFTING DEVICE

[76] Inventors: Mario Tanferna; Alessandro Mascioli; Angelo Ciminelli; Franco Polo; Carlo Boschetto, all of Via Ariosto 24, Rome, Italy

[22] Filed: July 16, 1974

[21] Appl. No.: 489,036

[30] Foreign Application Priority Data

July 16, 1973 Italy ................................ 51494/73

[52] U.S. Cl. .............................................. 417/240
[51] Int. Cl.² ........................................... F04F 7/00
[58] Field of Search .................................... 417/240

[56] References Cited
UNITED STATES PATENTS

| | | | |
|---|---|---|---|
| 430,790 | 6/1890 | Starkenberg | 417/240 |
| 650,167 | 5/1900 | Colman | 417/240 |
| 810,182 | 1/1906 | Beau | 417/240 |
| 2,560,851 | 7/1951 | Dickinson | 417/240 |

*Primary Examiner*—Martin P. Schwadron
*Assistant Examiner*—H. Burks, Sr.
*Attorney, Agent, or Firm*—Browdy & Neimark

[57] ABSTRACT

A water lifting device consists of a hollow body with an open bottom immersed in a body of water subject to wave motion, with a section which gradually narrows towards its upper end which terminates in a delivery tube located above the maximum height of the waves thereby projecting water upwardly through the delivery pipe.

8 Claims, 2 Drawing Figures

WATER LIFTING DEVICE

The invention belongs to the field of water lifting devices, and more particularly to a device which utilizes the wave motion of a body of water, such as a sea, to lift water to a level higher than the crests of the waves produced by said motion. The lifted water may be stored in a reservoir to form a source of power.

Basically, the device consists of at least one vertical hollow body partially immersed in the sea or other body of water. Said hollow body has an open bottom or inlet and is of a section which gradually narrows towards its upper or outlet end. The latter terminates in an also vertical delivery pipe, whose outlet is located above the maximum height reached by the waves.

The wave motion of the sea water will produce a vertically reciprocating motion of the water level in the interior of said hollow body. The rise of this level inside the increasingly narrowing interior of the hollow body will also cause a narrowing of the upward directed stream of water and consequently an acceleration of this stream, according to Bernouilli's law. This acceleration, when all other parameters remain constant, is a function of the taper of said hollow body or, more generally, of the difference between the cross section of the bottom opening and the outlet opening. As a result of this acceleration, the water will be projected through the outlet and through the vertical delivery pipe to a level which is much higher than the crest of the wave which produced it. This water can therefore be projected into a storage tank located at this higher level and the resulting head of water can be utilized to produce power.

In a further development of the invention, the just described device may be completed so as to also utilize the downward movement of the water column within said hollow body. By closing the storage tank, as by a hermetically fitting lid, said downward motion will produce a vacuum in it. By connecting the interior of the tank through a suction pipe with the sea, this vacuum will also lift water into the tank.

By providing a third pipe which extends from near the tank bottom vertically, with an airtight fit through the lid of the tank, and installing in said pipe a check valve permitting flow only in a rising direction, once the water level in said tank has risen above the lower end of said pipe, each inflow of water into said tank will cause an increase in the air pressure within it and this will force water to rise stepwise in said third pipe. Thus, water will be lifted well over said tank to flow from said third pipe into a storage reservoir, and the head of water so obtained may be utilized for power production. Advantageously, a number of such devices will deliver into a single storage tank.

For a purely illustrative and in no way limitative purpose, two embodiments of the invention will now be described with reference to the attached drawing, wherein:

FIG. 1 shows a first embodiment; and
FIG. 2 shows a second embodiment of the invention.

The embodiment of FIG. 1, which is the basic form of the device, comprises the already mentioned hollow body 2, whose open bottom 4 is preferably protected by a grate. Its bottleneck-shaped outlet extends in a vertical delivery pipe 6 whose upper portion is formed into an inverted U-bend 8 having an outlet which opens into a tank 12. The bottom of the tank is provided with a removable pan 14 for the inspection and cleaning of the tank interior. Similarly the upper end of the delivery pipe 6 is provided with a removable plug 16 to permit the inspection and scavenging of the pipe interior.

The unit formed by the hollow body, the pipe 6 and its bend 8 shall be termed in the following "extruder" for the sake of brevity, is generally indicated at 1. It is immersed in the sea to a depth greater than A/2, A being the maximum expected height of the waves from crest to trough. Obviously, a number of such extruders may discharge into tank 12, which is provided with an outflow conduit 18 for the connection of the tank with machines utilizing the head D of the water stored in said tank to produce work.

The operation of this first embodiment has already been explained in the introductory part of this specification.

The embodiment shown in FIG. 2 comprises, in addition to said extruder 1, a closed tank 13, the already mentioned suction pipe, here indicated at 20, whose inlet dips in the sea for a depth greater than A/2, and the already mentioned third pipe or riser, here indicated at 24. The uppermost portion of the suction pipe 20 forms an inverted U-bend 22, whose downwardly directed outlet terminates near the bottom of tank 13. Similarly the lower, inlet end of the riser 24 is positioned slightly above said bottom, while its upper, discharge end projects above a predetermined water level of a storage reservoir 28 positioned higher than said tank. A check valve 30 in the suction pipe 20 and a check valve 32 in the riser 24 permits the water in these pipes to flow merely in an upward direction.

Tank 13 is closed by an airtight lid 10. Through this lid are led, with an airtight fit, the riser 24 and the downwardly directed legs of the bends 8 and 22.

A number of the above described devices is mounted on a floating structure, so that its immersion remains constant irrespective of the tide levels of the sea.

At the beginning of its operation, the water in the extruder 1 and in the suction pipe 20 will reach the level 0 when the sea is calm. When wave motion sets in, the water in the extruder will sink correspondingly to a wave trough, and the corresponding reduction of the air pressure in tank 13 will suck in water through pipe 20. Successively, when the wave rises in the extruder, water will also spill through pipe 6 into the tank. In this manner, the rise of the water level in the tank will cause a reduction of the air volume in the latter. Once this level has risen above the inlet of riser 24, the air entrapped in tank 13 can no more escape through the valve 32, and therefore the volumes of water additionally inflowing through pipes 6 and 20 will result in an increase of the air pressure. Once this pressure has reached a given value, the operation of the device automatically changes, since the extruder will no more operate as such, i.e., it will no more be capable of delivering additional water into the tank, being prevented from it by the air pressure in said tank. Instead, the liquid column in the hollow body 2 will solely act similarly to a piston of a pneumatic cylinder pump. In fact, the pipe 6 together with its bend 8 will only contain air which, when said liquid column rises, will increase the air pressure in tank 13 and thus force a certain amount of water to rise in the riser 24 for a given height, while forcing valve 30 against its seat. In the successive half wave cycle, in which the water column sinks in the extruder, the air contained in its upper part and in tank 13 will expand almost adiabatically, thus causing a volume of water to be sucked in through pipe 20. This volume, which is identical to that previously pressed into the riser 24, will similarly be forced into the latter at the next upward motion of the water column in the extruder 1. In this manner, the water in said riser will reach, step by step, the top of the riser 24 located at the height H above the water level 0 and spill into a storage reservoir 28.

The check valve 32 in the riser 24 is located at such a level that the water column below it will not flow back into the tank when the air in it reaches its lowermost pressure. Thus the water in the riser will be lifted stepwise into the storage reservoir.

As already stated, the device according to the invention will be assembled in groups to deliver water into a common storage reservoir. A discharge conduit 30 in the reservoir 28 will be connected to turbines or other machines to convert the water head H into power.

It is obvious that many variants and changes may be applied to the above described embodiments of the invention without departing from its scope. It is understood that all these changes and variants are encompassed in it.

What is claimed is:

1. A water lifting device comprising a hollow body having an open bottom or inlet end immersed in a body of water and an also open upper or outlet end of a section narrower than said bottom end and extending in a delivery pipe ending in an outlet located above the maximum expected height of the waves of said body of water, the narrowing of said upper end causing the acceleration of the waves rising within said hollow body, to project water through said delivery pipe.

2. A water lifting device according to claim 1, further comprising an open tank positioned above said maximum expected height to receive the water projected through said delivery pipe.

3. A water lifting device according to claim 1, wherein the lower end of said hollow body is protected by a grate and its outlet is bottleneck-shaped, said outlet extending in a delivery pipe terminating in an inverted U-bend, a removable plug being provided correspondingly to said bend for the inspection and scavenging of the interior of said pipe.

4. A water lifting device according to claim 1, further comprising a closed tank, the outlet end of said delivery pipe passing with an airtight fit into said tank, a suction pipe whose inlet end is immersed in said body of water and whose discharge end also passes with an airtight fit into said tank.

5. A device according to claim 4, further comprising a third pipe or riser passing with its lower end into said tank with an airtight fit, check valves, permitting only an upwardly directed water flow, being provided in said suction pipe and in said riser.

6. A device according to claim 5, wherein the upper portion of said suction pipe is formed into an inverted U-bend, said discharge end of said suction pipe forming one leg of said U-bend which passes with said airtight fit into said tank to terminate slightly above its bottom.

7. A device according to claim 1, wherein the bottom end of said hollow body is immersed at a depth greater than the level of the trough of the maximum expected wave of said body of water.

8. A device according to claim 5, wherein the bottom end of said hollow body and the inlet end of said suction pipe are immersed at a depth greater than the level of the trough of the maximum expected wave of said body of water.

* * * * *